United States Patent [19]

Sogabe et al.

[11] Patent Number: 4,647,010
[45] Date of Patent: Mar. 3, 1987

[54] COMBINED TORQUE MOTOR AND ROTARY FLOW CONTROL VALVE UNIT

[75] Inventors: Ichita Sogabe, Gifu; Shuuji Murata, Nagoya; Yuji Yokoya, Toyota, all of Japan

[73] Assignees: Nippondenso Co., Ltd., Kariya; Toyota Jidosha Kabushiki Kaisha, Toyota, both of Japan

[21] Appl. No.: 812,323

[22] Filed: Dec. 23, 1985

[30] Foreign Application Priority Data

Dec. 26, 1984 [JP] Japan .............................. 59-276893

[51] Int. Cl.$^4$ ............................................. F16K 31/08
[52] U.S. Cl. .................................. 251/129.12; 251/65; 335/229
[58] Field of Search ............... 251/129.11, 65, 129.12; 335/229, 230, 234

[56] References Cited

U.S. PATENT DOCUMENTS

| 2,718,614 | 9/1955 | Gamble | 335/229 |
| 2,833,508 | 5/1958 | Bydalek et al. | 251/129.11 |
| 3,175,585 | 3/1965 | Faisandier | 137/625.65 |
| 3,347,262 | 10/1967 | Gibson | 251/129.11 X |

Primary Examiner—Arnold Rosenthal
Attorney, Agent, or Firm—Cushman, Darby & Cushman

[57] ABSTRACT

A combined torque motor and rotary flow control valve unit (10) incorporating a torque motor (12) and a rotary flow control valve (14). The unit (10) includes an enclosure member (70) surrounding a rotor (38) of the torque motor (12) and fluid-tightly isolating the stationary part (18) of the torque motor from a sealed chamber (96) defined within the enclosure member (70) to prevent fluid leakage. Preferably, the chamber (96) in the enclosure member (70) is communicated with a fluid inlet (56) of the valve (14) to counterbalance fluid pressures acting on a rotary flow control member (54) of the valve, thereby eliminating any axial thrust that would otherwise be exerted on the rotary flow control member due to the fluid pressure acting thereon in one direction.

3 Claims, 7 Drawing Figures

COMBINED TORQUE MOTOR AND ROTARY FLOW CONTROL VALVE UNIT

BACKGROUND OF THE INVENTION

1. Field of the Invention

The present invention relates to a combined torque motor and rotary flow control valve unit which is adapted to control a flow of a fluid through a fluid channel in response to electric signals.

2. Description of the Related Art

A combined torque motor and flow control valve unit has previously been proposed in which a torque motor and a rotary flow control valve are incorporated within a common housing (e.g., Japanese Unexamined Patent Publication (Kokai) No. 60-180466). The torque motor includes a stationary electromagnet and an oscillatable rotor which is made from a permanent magnet and is magnetically biased in one direction or the other according to the polarities of the electromagnet. The rotary flow control valve includes a rotary flow control member which is fitted with clearance within a bore of the housing. A common shaft rotatably supported by the housing is disposed between the torque motor and the flow control valve. An end of the shaft is connected to the rotor of the torque motor and the other end of the shaft connected to the rotary flow control member to couple the rotor and the flow control member with each other in a torque transmitting relationship.

The problem which must be overcome in the design of a combined torque motor and rotary valve unit where high hydraulic pressures are encountered is to provide an adequate sealing means which will prevent fluid leakage through the clearance between the rotary flow control member and the bore in the housing into the component parts of the torque motor. It has often been necessary to provide an O-ring which is disposed under a very high sealing pressure between the housing and the rotatable shaft in order to prevent fluid leakage around the shaft. The sealing pressures have been high enough to inhibit the oscillating movement of the shaft. The rotatable shaft is subjected to high frictional forces which, in turn, considerably increase the loads to be imposed on the torque motor. To overcome the frictional forces, a large high output torque motor has been required.

SUMMARY OF THE INVENTION

The primary object of the present invention is to eliminate any frictional force exerted on the rotatable shaft due to a sealing arrangement and to provide a combined torque motor and rotary flow control valve unit having a torque motor which is compact in size.

This invention provides a combined torque motor and rotary flow control valve unit of the nature described which comprises an enclosure for fluid-tightly isolating the stationary part of the torque motor from the oscillatable rotor and the flow control valve. The enclosure is made from a magnetically permeable material so as not to interrupt the magnetic coupling between the stationary magnet and the rotor. The enclosure is radially spaced from the rotor to surround the latter, thereby defining a sealed chamber in which the rotor is rotatable through an angle together with the rotary flow control member of the valve. The stationary part of the torque motor is hydrostatically isolated from the sealed chamber so that there would occur no fluid leakage into the stationary part. The enclosure is sealingly fixed to the housing and there is no sliding engagement between the enclosure and the rotatable shaft or other movable member of the unit. Thus, the shaft is entirely free from any sealing force that would otherwise hinder smooth rotation of the shaft.

Preferably, a balancing passage is provided to communicate the inlet of the valve with the chamber in the sealing enclosure. In this manner, the fluid pressure applied on the opposite sides of the rotary flow control member is counterbalanced, thereby eliminating the possibility of axial thrust.

DESCRIPTION OF THE PREFERRED EMBODIMENT

Figure 1:
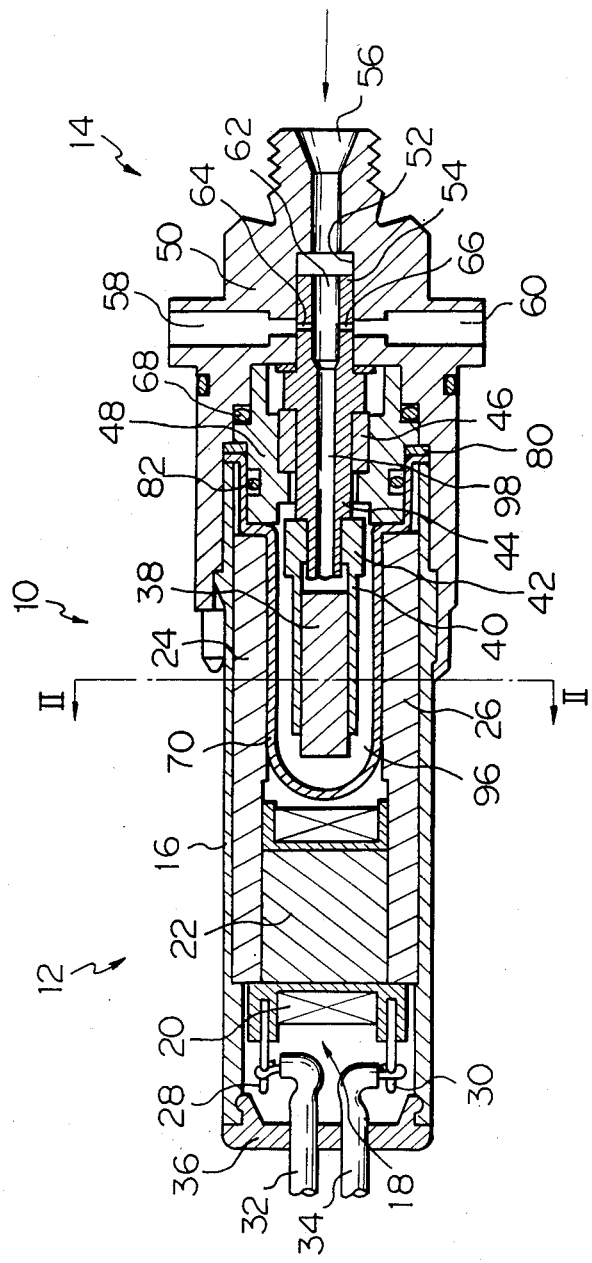
FIG. 1 is a longitudinal cross-sectional view of the combined unit according to the invention.

Referring to FIG. 1, there is shown the combined torque motor and flow control valve unit 10 incorporating a torque motor 12 and a rotary flow control valve 14. The torque motor 12 includes a tubular casing 16 made from a nonmagnetic material. The casing 16 receives therein an electromagnet 18 forming the stationary part of the torque motor 12. The electromagnet 18 includes a winding 20 and a yoke 22 having a pair of diametrically opposed pole pieces 24 and 26 closely fitted within the casing 16. The winding 20 is connected to terminals 28 and 30 which are, in turn, connected to lead wires 32 and 34 passing through a grommet 36 snap fitted to the casing 16. DC power is supplied to the winding 20 to energize the electromagnet 18 to generate a magnetic flux in either direction across the magnetic gap defined between the pole pieces 24 and 26. The movable part of the torque motor 12 comprises an oscillatable rotor 38 which is centrally located across the magnetic gap and firmly clamped between forked ends of a support 40 of nonmagnetic material. The rotor 38 comprises a permanent magnet which has been magnetized so that the magnetic poles thereof are diametrically opposed.

The tubular base 42 of the support 40 is rigidly secured to the left-hand end of a coaxial rotatable shaft 44 which, in turn, is rotatably supported through a bearing 46 by an inner housing 48.

The rotary flow control valve 14 includes a valve housing 50 having an axial bore 52 in which a cylindrically-shaped rotary flow control member 54 is clearance-fitted. In the illustrated embodiment, the rotary flow control member 54 is made integral with the rotatable shaft 44; that is, the rotary flow control member 54 and the shaft 44 are made as an integral element. The valve housing 50 has a fluid inlet 56 in fluid communication with the bore 52. Also, the valve housing 50.are provided with a pair of diametrically opposed fluid outlets 58 and 60 which are opened into the bore 52. The rotatable flow control member 54 has an axial passage 62 therethrough and a pair of diametrically opposed radial outlet ports 64 and 66 communicated with the central passage 62.

The casing 16, the valve housing 50, and the inner housing 48 together form the housing of the unit 10. The casing 16 is rigidly secured to the valve housing 50 by any suitable conventional fastening means. An O-ring 68 is provided between the valve housing 50 and the inner housing 48 to prevent fluid leakage therebetween.

Figure 3:
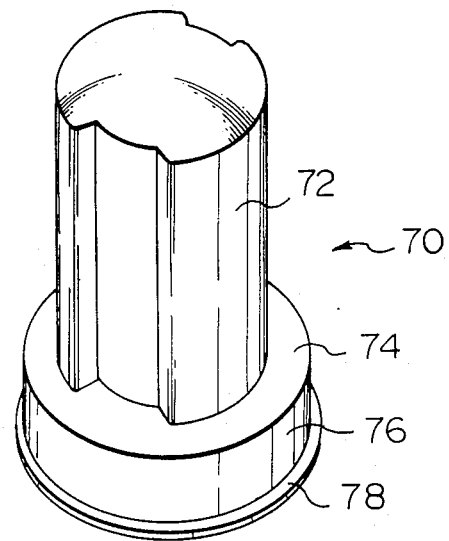
FIG. 3 is a perspective view of the enclosure member.

A cap-shaped or sleeve-like enclosure member 70 is provided around the rotor 38. The enclosure member 70 is made from a magnetically permeable material. As shown in FIGS. 1 and 3, the enclosure member 70 has a stepped, generally tubular configuration closed at one end and open at the other end. In the illustrated embodiment, the enclosure member 70 has an elongated main portion 72, a radially extending shoulder portion 74, a skirt portion 76, and a flange 78. The flange 78 is fluid-tightly clamped between an end of the casing 16 and a sealing ring 80 bearing against a shoulder in the valve housing 50. An O-ring 82 serves to prevent fluid leakage between the skirt 76 and the inner housing 48. The shoulder portion 74 of the enclosure member is securely clamped between the pole pieces 24, 26 and the inner housing 48.

Figure 2:
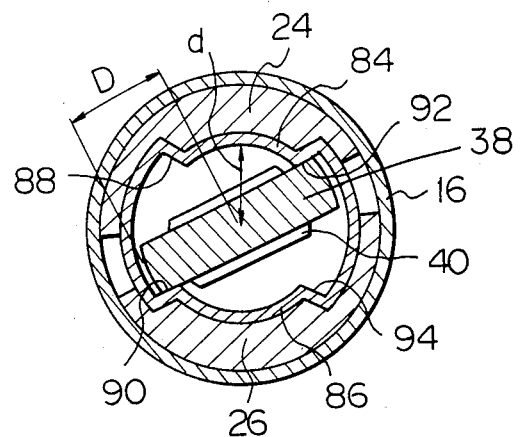
FIG. 2 is cross-sectional view taken along the line II—II of FIG. 1.

As shown in FIGS. 2 and 3, the main portion 72 of the enclosure member 70 has diametrically opposed side walls 84 and 86 which are inwardly indented to form two pairs of shoulders 88, 90, 92, and 94. The radius D of the rotor 38 is larger than the inner radius d of the side walls 84 and 86 so that these shoulders 88, 90, 92, and 94 form abutments limiting the angular movement of the rotor 38. The inner surfaces of the pole pieces 24 and 26 are so shaped to snugly fit the main portion 72 of the enclosure member 70 so that the main portion 72 is laterally supported thereby.

The enclosure member 70 surrounds the movable part of the unit including the rotor 38, the forked support 40, and a part of the shaft 44 and defines a sealed chamber 96 rotatably receiving the movable part. In this manner, the stationary part of the electromagnet 18 is hydrostatically isolated by the enclosure member 70 from the chamber 96.

The shaft 44 has a balancing passage 98 communicating the chamber 96 to the central passage 62. The balancing passage 98 serves to introduce the fluid pressure at the inlet 56 into the sealed chamber in order to counterbalance the fluid pressures acting in opposite directions on the rotary flow control member 54, as described later in more detail.

Figure 4A:
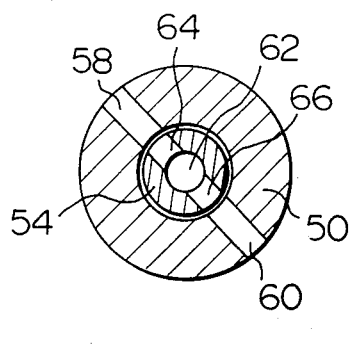
FIGS. 4A and 4B are cross-sectional views illustrating, respectively, the rotary flow control member and the motor rotor in their first position, in which fluid inlet is communicated with the fluid outlets.
Figure 4B:
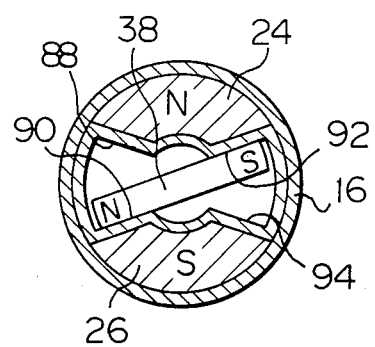

The operation of the combined unit 10 is as follows. When the electromagnet 18 is energized to magnetize the pole piece 24 in the N polarity and the pole piece 26 in the S polarity, the electromagnet biases the rotor 38 to rotate it counterclockwise as viewed in FIG. 4B, causing the flow control member 54 to rotate in the same direction, until the rotor 38 abuts against the shoulders 90 and 92. In this position, the fluid inlet 56 of the valve 14 is communicated through the central passage 62 and outlet ports 64 and 66 with the fluid outlets 58 and 60 as shown in FIG. 4A. The rotor 38 is held in this position with a large detent torque due to magnetic coupling developed between the permanent magnet rotor 38 and the magnetized pole pieces 24 and 26, thereby firmly retaining the rotary flow control member 54 in its open position.

Figure 5A:
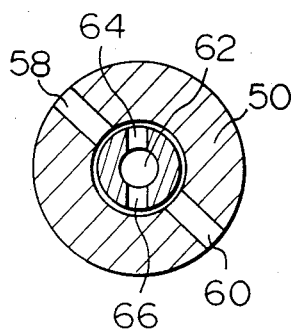
FIGS. 5A and 5B are views similar to FIGS. 4A and 4B but illustrating the flow control member and the rotor in their second position, in which the fluid outlets are shut off from the fluid inlet.
Figure 5B:
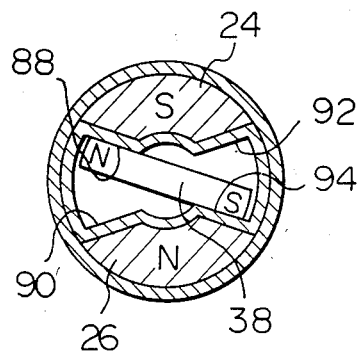

Conversely, when the electromagnet 18 is energized to have the pole piece 24 magnetized in the S polarity and the pole piece 26 in the N polarity, the rotor 38 is biased to rotate clockwise until it abuts against the shoulders 88 and 94 as shown in FIG. 5B, thereby causing the flow control member 54 to rotate in the clockwise direction as shown in FIG. 5A. In this position, the radial outlet ports 64 and 66 are brought out of alignment with the fluid outlets 58 and 60 so that the flow control member 54 shuts off the flow of fluid from the inlet 56 toward the outlets 58 and 60. The flow control member 54 is retained with a large detent torque as long as the electromagnet 18 remains energized.

The sealed chamber 96 will be filled with the high pressure fluid at the inlet 56 of the valve 14 due to the presence of the passage 98 and also due to the fluid seeping through the clearance between the bearing 46 and the shaft 44. It will be appreciated, however, that the enclosure member 70 encases the fluid in the chamber 96 and prevents the high pressure fluid from leaking into the stationary part of the torque motor 12. Otherwise, it would be necessary to arrange an O-ring in the vicinity of the bearing 46 in order to provide sealing around the shaft 44. Provision of such an O-ring would result in frictional forces that would restrain the rotational movement of the shaft 44, thereby requiring the torque motor 12 to develop additional torque on the order of 0.2–0.4 kg·cm. According to the invention, it is possible to eliminate the provision of an O-ring between the housing of the unit and any movable part thereof, thereby reducing the frictional resistance on the movable part. In this manner, the required output torque of the torque motor 12 is minimized so that it is possible to use more compact torque motor.

It will also be appreciated that, due to the presence of the balancing passage 98, the fluid pressure in the chamber 96 is in equilibrium with the fluid pressure at the inlet 56. Thus, the axial force acting on the cross-sectional area of the flow control member 54 by the fluid pressure prevailing in the bore 52 will be counterbalanced by an axial force acting in the opposite direction on the same cross-sectional area of the flow control member due to the fluid pressure in the sealed chamber 96. In this way, the shaft and control member assembly undergoes no axial thrust that would bring the assembly in axial frictional engagement with the bearing 46. Otherwise, in the absence of the balancing passage 98 and the high pressure chamber 96, the flow control member 54 would be subjected to a large axial thrust when the pressure of the incoming fluid at the inlet 56 is of a relatively high value ranging from 30 to 100 kg/cm$^2$. Such axial thrust would urge the shaft 44 to axially bear against the bearing 46, thereby increasing the frictional resistance therebetween. According to the present invention, the fluid forces acting on the shaft and flow control member assembly in the axially opposite directions are entirely counterbalanced. This enables control of the fluid channel of the valve 14, where a relatively high pressure is applied, with a torque motor 12 of a reduced output torque.

In summary, the combined torque motor and flow control valve unit according to the present invention is operable without the problem of high pressure fluid leakage. The frictional force between the movable part and stationary part due to axial thrust is minimized. This enables the use of a more compact torque motor which, in turn, renders the overall size of the unit more compact. Further, the combined unit of the invention is suitable for use in controlling fluid channels at elevated fluid pressures.

Although the present invention has been described herein with reference to a specific embodiment thereof, it should be understood that the invention is not limited thereby and various changes and modifications will be apparent for those skilled in the art without departing the scope of the present invention. For example, the torque motor 12 may be implemented as a stepping motor or other types of electromagnetic motors having a rotor made of a permanent magnet. Similarly, the rotary flow control valve 14 may have different number of fluid outlets.

We claim:

1. A combined torque motor and rotary flow control valve unit wherein said torque motor includes an electromagnetic stationary part and an oscillatable rotor electromagnetically moved by said stationary part, said flow control valve including a rotary flow control member axially aligned with said rotor and coupled therewith through a coaxial common shaft rotatably supported by a housing of the unit, the improvement comprising:

enclosure means made from a magnetically permeable material for fluid-tightly isolating said stationary part of the torque motor from said rotor and said flow control valve.

said enclosure means being radially spaced from and surrounding said rotor to permit said rotor to oscillate through an angle within said enclosure means, wherein:

said enclosure means comprises a cap-shaped enclosure member closed at an end thereof opposite said flow control valve, said closure member defining a sealed chamber therein surrounding said rotor, said flow control valve comprises an inlet for a fluid under pressure, and wherein said unit further comprises passage means for communicating said inlet with said chamber in said enclosure member to admit a fluid under pressure at said inlet into said chamber, the fluid pressure in said chamber acting on said shaft to counterbalance the fluid pressure acting on said rotary closure member in opposite direction, wherein said passage means is provided axially through said shaft and said rotary closure member, said stationary part of said torque motor comprises a pair of longitudinally extending, diametrically spaced pole pieces closely fitted within said housing of the unit and wherein a substantial part of said enclosure member is laterally supported by said pole pieces.

2. A combined torque motor and rotary flow control valve unit according to claim 2, further comprising abutment means for limiting the angular oscillation of said rotor.

3. A combined torque motor and rotary flow control valve unit according to claim 2, wherein said abutment means comprises at least a pair of shoulders formed on the inner wall of the enclosure member, said shoulders being angularly spaced apart from each other and located at a distance from a center of rotation of said rotor smaller than the radius of said rotor.

* * * * *